United States Patent Office.

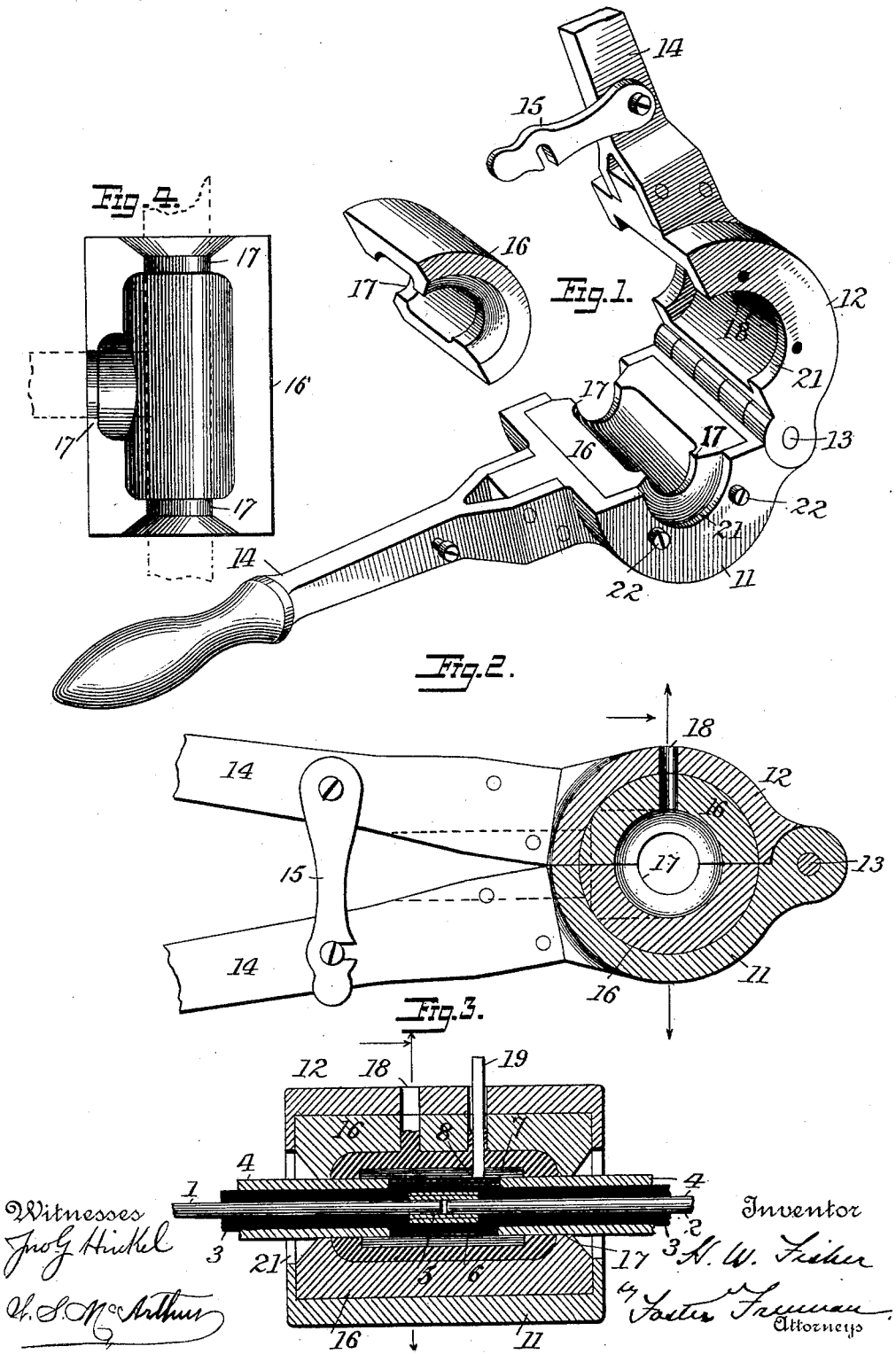

HENRY W. FISHER, OF PITTSBURG, PENNSYLVANIA, ASSIGNOR TO THE STANDARD UNDERGROUND CABLE COMPANY, OF SAME PLACE.

JOINT-MOLD.

SPECIFICATION forming part of Letters Patent No. 467,881, dated January 26, 1892.

Original application filed March 7, 1891, Serial No. 384,158. Divided and this application filed September 25, 1891. Serial No. 406,807. (No model.)

*To all whom it may concern:*

Be it known that I, HENRY W. FISHER, a citizen of the United States, residing at Pittsburg, Allegheny county, State of Pennsylvania, have invented certain new and useful Improvements in Joint-Molds, of which the following is a specification.

My invention relates to the manufacture of joints for electric conductors, and more especially to apparatus whereby the conductors may be united by what is known as a "hollow cast-metal joint"—such, for instance, as is more particularly described in my prior application, Serial No. 384,158, of which this application is a practical division; and it has for its object to provide a mold by means of which the hollow cast-metal or other joints may be quickly and easily made and the conductors or other devices united by a joint which is practically and thoroughly air and moisture proof; and to these ends my invention consists in a mold constructed and arranged as hereinafter more particularly pointed out.

Referring to the accompanying drawings, Figure 1 is a perspective view showing a mold open, one of the blocks being shown detached. Fig. 2 is a longitudinal vertical section through the mold. Fig. 3 is a transverse sectional view through the mold, showing it applied to the formation of a hollow cast-metal joint uniting the ends of two electrical conductors. Fig. 4 is a plan view of a modified form of a bowl.

While my invention is applicable for various purposes and the uniting of various materials by means of a joint, it is more especially intended for use in connection with forming joints of electrical conductors. These electrical conductors, which are commonly used in conduits, overhead, or otherwise, are usually covered with a practical armor of metal, such as lead, and the wires or conductors are thoroughly insulated from each other and from the surrounding elements. It is necessary, however, to connect the ends of two cables or conductors, and in doing this it is requisite that the joint should be so made that the insulating properties of the cable will not be impaired, as well as that there should be a firm and solid union between the parts of the cable by means of the joint. These joints have heretofore been usually made by hand, requiring the services of a skilled workman and necessitating a long and tedious operation to form a wiped or other metal joint between the cables; and it is the object of my present invention to provide a mold whereby such joints may be readily, easily, and quickly made by an ordinary workman without impairing and at the same time preserving the insulating properties of a conductor to the fullest degree.

It is evident that the details of form, construction, and arrangement of the device must vary to suit the requirements of any particular case and the kind of joint that is to be made, and I have illustrated my invention embodied in a form for uniting the adjacent ends of two conductors or cables, as this is the more common form of joint used. In Fig. 3, for instance, I have illustrated the adjacent ends of two cables in which 1 2 are the conductors, which are coated with some insulating material 3 and inclosed in a protective covering 4, such as lead and the like. In order to form the joint the insulating material and the protective covering are removed from the ends of the conductors, and the ends of the conductors are placed in contact or otherwise connected— as, for instance, by a sleeve 5 of some conducting material, and over this sleeve may be wound or otherwise applied some insulating material 6. If a solid joint is to be used, the conductors in this condition are united by casting, by the aid of a mold hereinafter described, a solid joint or union of some suitable material, as lead, by pouring it around the adjacent or abutted ends of the conductors when inclosed within the mold. In other instances it is desirable to make what is known as a "hollow cast-metal joint," and when this is to be done I place over the adjacent ends of the conductors a sleeve, as 7, and this may be of any suitable material, but preferably of insulating material, as papier-maché or a vitrified substance, and may be of any suitable shape or construction, and this sleeve is provided with a suitable opening 8.

The mold itself consists, essentially, of two portions 11 12, which are preferably hinged together, as at 13, and provided with suitable handles 14, by means of which they may be operated, and in order that they may be held together to firmly grasp the conductors while the joint is being made I provide some suitable connector or latch, as 15. The portions 11 and 12 consist of a half-round case of metal having openings 21 in their ends, and fitting in these cases 11 are the bowls or molds 16, having an outer configuration to accurately fit the interior of the case, and these molds may be retained in place by some suitable means, as the screws 22.

These molds are made removable and may be of various internal configurations and sizes adapted to form joints of different contours and unite conductors of different sizes, while their exterior surfaces are all of the same size to accurately fit the cases.

These molds are provided at each end with an inwardly-projecting rim 17, which is adapted to fit closely upon the exterior of the conductors or other devices being united—as, for instance, upon the armor-covering 4. If the two cables or conductors to be joined are of the same size, of course the rims will be the same size at each end; but if the cables or conductors are of various sizes or a splice is to be made between two or more cables or conductors the rims are made of a configuration to suit the purposes for which they are used.

In Fig. 4 I have shown a bowl adapted to make a T-joint or union of the cables or conductors, the latter being indicated in dotted lines. It will be understood that if this is used to unite an insulated conductor or cable the conductors are first brought in contact and electrically connected in the usual way and placed in the bowl and the hollow or solid joint cast around the same, and if a bare conductor is simply spliced onto another conductor, so as to extend laterally, it may be done in the usual manner and then the joint cast around the splice. From this it will be seen that the mold may be used for making various kinds and forms of joints to unite either bare conductors, insulated conductors, or cables, it being simply necessary to have the internal configuration or recesses in the bowls made of the proper shape. When conductors are united, I find it convenient to cut the ends square across and put them together and apply a little solder or tin, so as to prevent them from slipping or changing their relative positions while the joint is being cast around them. One of the cases, as 12, is provided with two or more pouring-holes 18, and the removable blocks are provided with corresponding holes. When a solid joint is to be made, the metal may be poured through one of the holes and the other pouring-hole will simply act as vent therefor; but when the mold is used to make the hollow cast-metal joint I place a rod 19, which is preferably of metal, in one of the pouring-holes, and this rod extends to the sleeve 7, corresponding to the openings 8 therein, and when the metal has been cast to form the joint this rod can be removed and the interior of the sleeve filled with some suitable insulating material and the hole through the joints subsequently closed.

Such being the general construction of the device, its operation will be readily understood and need not be specifically set forth in detail, and while I have illustrated the preferred construction of my device as applied to making metal joints for electric conductors, I do not limit myself thereto, as the features of invention may be applied to other unions and purposes and the devices modified in accordance therewith by those skilled in the art.

What I claim is—

1. A joint-mold consisting of two hollow portions connected together and provided with removable bowls having registering recesses forming openings to receive the parts to be joined, substantially as described.

2. A mold for making joints for electric conductors, comprising two hollow cases united together and provided with suitable handles and removable bowls fitting said hollow portions, the bowls being provided with inwardly-projecting rings and recessed to form openings to permit the parts to be joined, substantially as described.

3. A mold for uniting electric conductors, consisting of two hollow portions having registering recesses forming openings, removable bowls fitting the hollow portions, and one of the portions and bowls being provided with two or more pouring-holes, substantially as described.

4. In a mold for making hollow cast joints, consisting of two hollow portions or cases having registering recesses forming openings at their ends, removable bowls having recesses and projecting rims, one of the cases and bowls being provided with two or more pouring-holes, one of which is adapted to receive a rod to form an opening for the insertion of the insulating material within the hollow cast joint, substantially as described.

In testimony whereof I have signed my name to this specification in the presence of two subscribing witnesses.

HENRY W. FISHER.

Witnesses:
J. W. MARSH,
J. W. SMITH.